United States Patent [19]

Kröll

[11] 4,427,322
[45] Jan. 24, 1984

[54] CLAMPING ELEMENT FOR CUTTING TOOL

[75] Inventor: Augustin Kröll, Breitenwang, Austria

[73] Assignee: Schwarzkopf Development Corporation, New York, N.Y.

[21] Appl. No.: 250,285

[22] Filed: Apr. 2, 1981

[30] Foreign Application Priority Data

Apr. 4, 1980 [AT] Austria ................... 1880/80

[51] Int. Cl.³ ............................................. B26D 1/00
[52] U.S. Cl. ..................................................... 407/105
[58] Field of Search ................................ 407/104, 105

[56] References Cited

U.S. PATENT DOCUMENTS

| | | | |
|---|---|---|---|
| 3,488,822 | 1/1970 | Jones | 407/105 |
| 3,611,527 | 10/1971 | Hudson | 407/104 |
| 3,740,807 | 6/1973 | Getts | 407/104 |
| 3,805,351 | 4/1974 | Mayer | 407/104 |
| 3,815,195 | 6/1974 | McCreery | 407/105 |
| 3,854,183 | 12/1974 | Roos | 407/104 |
| 4,044,440 | 8/1977 | Stier | 407/105 |
| 4,204,781 | 5/1980 | Johann | 407/105 |

FOREIGN PATENT DOCUMENTS

| | | | |
|---|---|---|---|
| 244009 | 7/1974 | Fed. Rep. of Germany | 407/105 |
| 2703696 | 8/1978 | Fed. Rep. of Germany | 407/106 |
| 2002273 | 2/1979 | United Kingdom | 407/105 |

Primary Examiner—Leonidas Vlachos
Assistant Examiner—Jerry Kearns
Attorney, Agent, or Firm—Morgan, Finnegan, Pine, Foley & Lee

[57] ABSTRACT

There is disclosed an improved cutting tool having a body provided with a threaded borehole, a clamping bolt and a recess, and which is provided with a supporting surface and at least one lateral supporting surface for supporting an indexable cutting insert. The insert is provided with a center hole for receiving the clamping bolt which has a rotationally symmetrical shaped portion for engaging the center hole thereof. The upper end of the clamping bolt has the form approximately of a clipped ball and the lower end is screwable into the threaded borehole of the tool body with the center portion thereof supported on the tool body; the borehole of the tool body being provided with two coaxial upper and lower cylindrical sections of different diameters extending perpendicular to the surface supporting the cutting insert. In a modified embodiment of the invention, the coaxial upper and lower cylindrical sections of the borehole of the tool body are connected by way of a shoulder formed by a bushing inserted in the borehole.

3 Claims, 2 Drawing Figures

CLAMPING ELEMENT FOR CUTTING TOOL

BACKGROUND OF THE INVENTION

Indexable cutting inserts are normally screwed into the body of the tool by means of clamping screws, clamped therein by means of a clamping bolt engaging the center hole by being tilted in the hole, or secured in the body of the tool by screwing and simultaneous canting of the clamping bolt.

A cutting tool is known from German Pat. No. 15 52 296 which consists of a tool holder and an exchangeable, indexable cutting insert provided with a center hole. The indexable cutting insert is capable of being clamped by way of a clamping bolt disposed in a shank borehole and capable of being screwed into a threaded borehole provided in the shank of the tool, the clamping bolt engaging the center hole of the indexable cutting insert with its head portion. The section of the shank borehole disposed adjacent to the recess for receiving the indexable cutting insert is tapered downwardly in the form of a frustum of a cone and cooperates with a section of the clamping bolt which is tapered downwardly in the form of a truncated cone. The longitudinal axis of the truncated section is displaced with respect to the longitudinal axis of the adjacent threaded borehole towards the supporting surface of the cutting insert, so that a tilting motion, and thus clamping of the indexable cutting insert, is achieved when the clamping bolt is screwed into the borehole. It is a drawback of this system that the clamping force of the indexable cutting insert is insufficient mainly in the direction of the surface supporting the cutting insert. This means that the indexable cutting insert may lift itself from the supporting surface in the presence of higher loads. This drawback is caused by the only slight relative motion of the clamping surface of the clamping bolt with respect to the wall of the center hole of the cutting plate.

German laid-open patent specification No. 24 02 971 specifies a cutting tool holder for receiving a center-hole, indexable cutting insert arranged in a recess of the supporting plate and capable of being clamped against the supporting surfaces and the supporting plate by means of a clamping bolt screwed into a threaded borehole of the shaft of the holder. In this embodiment, a conical section of the clamping bolt abuts a counter surface having the form of a bay provided on a bushing which encloses or surrounds the clamping bolt at least partially, and which is inserted in a borehole of the shaft of the holder. The preferably elastic bushing is provided with a collar supported in a mating recess of the supporting plate. When the clamping bolt is screwed in, it is deflected by the bay, and the head portion engaging the center hole clamps the indexable cutting insert. The drawback of this tool holder is that lateral loads acting on the indexable cutting insert may cause the clamping bolt to give way laterally, which may cause loosening of the clamping of the indexable cutting insert. Moreover, the fact that the bushing has an unsymmetrical structure may cause poor positioning of the bushing and thus lead to poor clamping of the cutting insert or, in the least favorable case, to no clamping of the cutting insert at all, which means that the bushing must be accurately positioned.

A cutting tool is specified in German published patent disclosure No. 27 03 696 in which a center-hole, indexable cutting insert is supported in a recess of the body of the tool on a supporting plate and capable of being clamped by means of a screwable clamping bolt of which the head portion engages the center hole of the indexable cutting insert. The clamping bolt is at least partially surrounded by a bushing inserted in a borehole of the tool body, this bushing having a collar and being supported on a mating surface of the supporting plate. On its face side, the bushing is provided with a beveling in the form of a truncated cone which is contacted unilaterally by a collar of the clamping bolt disposed directly beneath the indexable cutting insert when the clamping bolt is screwed into place. This causes the bolt to be tilted and to clamp the indexable cutting insert with respect to the supporting surface and the lateral supporting surfaces.

The disadvantage of this latter design is that the surface of the bushing contacting the collar of the clamping bolt is disposed outside of the zone of the shaft of the tool in the base plate, which means that said surface must absorb a flexural torque and thus be provided with particular stability. Moreover, it can be secured in the shaft of the tool with sufficient rigidity only by means of a press fitting, which is costly in terms of manufacturing technique.

The common feature of the systems described above is that while a indexable cutting insert must be clamped both against the supporting surface and at least one lateral supporting surface by screwing and simultaneous tilting of a clamping bolt, this system as such fails to achieve a clamping that could be deemed sufficient in general or at least sufficient simultaneously in both those directions, considering modern requirements in this regard. The reasons for such insufficient clamping are excessive frictional forces or an excessive increase of the frictional forces between the clamping bolt and the body of the tool as compared to the forces transmitted by the clamping bolt onto the indexable cutting insert, those forces occurring when said bolt is screwed into place. Furthermore, elements of design or insufficient consideration of manufacturing tolerances are responsible in individual cases for an unreliable positioning and clamping of the indexable cutting insert.

Another decisive shortcoming of the known systems is that the change in pressure forces transmitted from the clamping bolt to the walls of the center hole of the cutting insert is from constant to increasing in each case by a constant angle of rotation when the clamping bolt is screwed into place. This normally makes it impossible to gradually approach and thus safely reach with a predetermined torque of the torque wrench the possible limit value of the pressure forces acting between the clamping bolt and the indexable cutting insert.

Therefore, it is the problem of the present invention to provide a cutting tool of the type defined above, in which the described drawbacks are substantially reduced and which thus ensures satisfactory clamping of the known indexable cutting insert with a center hole both against the supporting base plate and the lateral plate support, with reduced bearing of the manufacturing tolerances on the clamping of the plate. It is the particular problem of the invention to provide measures to the effect that the increase of the pressure forces transmitted from the clamping bolt to the walls of the center hole of the cutting insert is reduced as the clamping bolt is screwed into a threaded borehole in the shaft of the tool, i.e., that the increase of these forces is degressive.

DESCRIPTION OF THE INVENTION

The problem on which the present invention is based is solved by providing the borehole in the body of the tool within its zone adjacent to the recess with two coaxial cylindrical sections with different diameters and with one axial direction extending perpendicular to the surface supporting the cutting insert. The upper cylindrical section is tapered towards the lower cylindrical section by way of a shoulder curved circularly in the longitudinal section, and with the shoulder area extending without curved projection into the area of the cylindrical surface of the lower cylindrical section. The clamping bolt is tapered within the center zone from a cylindrical section to a threaded foot section by way of a shoulder curved circularly in the longitudinal section. The cylindrical section extends without projection of curvature into the shoulder area and the circular radii of the individual shoulders in each case have a ratio of from 1:1 to 1:2.3 with respect to the radius of the cylindrical portion of the center section of the clamping zone. The lower, threaded section of the borehole in the body of the tool is provided with an inclination of from 2 to 7 degrees against the axis of the cylinder in the direction of the surface supporting the cutting insert.

In a preferred embodiment of the invention, two cylindrical sections connected with each other by way of a shoulder are formed by a bushing which is inserted in a section of the borehole of the tool body having a constant diameter. In another, and especially preferred embodiment, the bushing is slotted in the longitudinal direction and provided with a collar supported in a recess of a base plate, this collar connecting the base plate with the body of the tool. In this way, it is possible to achieve the optimal clamping forces attainable by the invention also for cutting tools which are provided with a base plate, while the base plate and the body of the tool are safely connected with each other also when the indexable cutting insert is in the unclamped state.

BRIEF DESCRIPTION OF THE DRAWINGS

Two embodiments of cutting tools according to the invention are shown in the drawings and described hereinafter in greater detail. In the drawings.

DETAILED DESCRIPTION OF THE DRAWINGS

Figure 1:
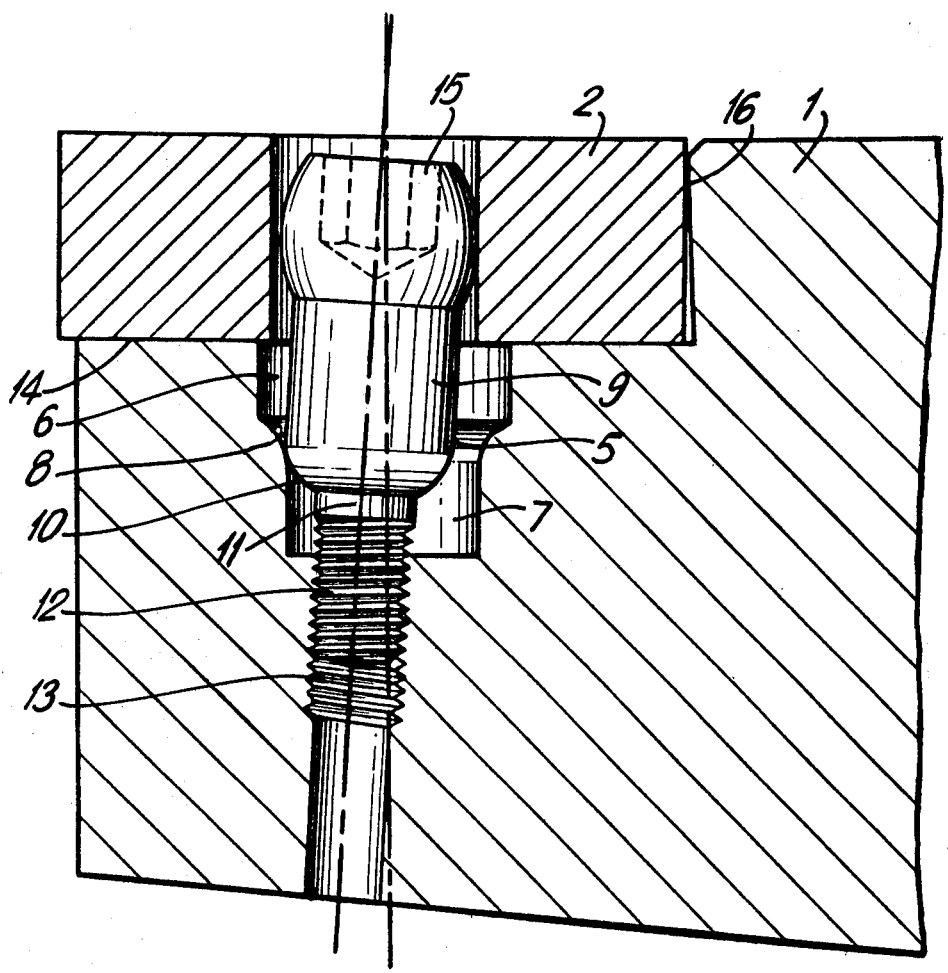
FIG. 1 shows a sectional view of the cutting tool in which the two cylindrical sections connected by way of a shoulder are formed by a borehole of the body of the tool.

FIG. 1 shows a cutting tool having a indexable cutting insert 2 with center hole arranged in a recess of tool body 1. Tool body 1 is provided with a borehole disposed directly beneath indexable cutting insert 2. The zone of the borehole disposed adjacent to the recess has two coaxial cylindrical sections 6 and 7, followed by a threaded borehole 13. The longitudinal axis of borehole 13 is inclined by 3 degrees opposite the longitudinal axis of borings 6 and 7, towards the lateral supporting surface 16 of indexable cutting insert 2. The upper cylindrical section 6, having the larger diameter, extends into the lower cylindrical section 7, having the smaller diameter, by way of a shoulder 8, having a circular curvature in the longitudinal section. The arched surface of shoulder 8 extends into the area of the lower cylindrical section 7, without projection of curvature. A clamping bolt 5, provided with a rotationally symmetrical shape, is arranged in the borehole of the tool body and screwed into borehole threading 13.

The clamping bolt 5 has a head portion 15, in the form of a clipped ball, a cylindrical section 9 in the center zone, and a foot section 11 provided with a threaded section 12. The foot section 11 has a smaller diameter as compared to cylindrical section 9, and is connected with cylindrical section 9 by way of a shoulder 10, having a circular curvature in the longitudinal section, with the curved area extending into cylindrical section 9 without break in curvature. In the unclamped condition, the clamping bolt 5 is supported only in threaded borehole 13, without resting with its center portion on the walls of the boring in the body of the tool. The head section 15 of clamping bolt 5 is disposed in the center of the center borehole of the indexable cutting insert, also without resting on the walls. When clamping bolt 5 is screwed into place, the circularly curved shoulder 10 of clamping bolt 5 comes into contact with the circularly curved shoulder 8. Curved shoulder 8 connects the cylindrical sections 6 and 7 of the borehole of body 1 with each other. The radius of shoulder 8 has a ratio of 1:1.2 to the diameter of cylindrical section 9, and the one of shoulder 10 of 1:1.3. This provides the clamping bolt 5 with a degressive deflection. When the pressure surface of the head section 5 of the clamping bolt, engaging the center hole of indexable cutting insert 2, hits upon the walls of the hole, the tilting over of bolt 5 is highly reduced. As the bolt is screwed in further, the indexable cutting insert 2 is clamped with optimal clamping force components in the direction of supporting surface 14, and in the direction of the lateral supporting surface 16. The axis of threaded borehole 13 is inclined by 3 degrees opposite the remaining borehole of the body of the tool, so that the longitudinal axis of clamping bolt 5 approximately coincides with the longitudinal axis of threaded borehole 13 when in the clamped condition. By this measure, thread contact is achieved across the total threaded section and any premature, undesirable automatic jamming of the thread is avoided. Moreover, friction in the threading is kept very low, which permits fully transmission of the clamping force onto reversible cutting plate 2.

Figure 2:
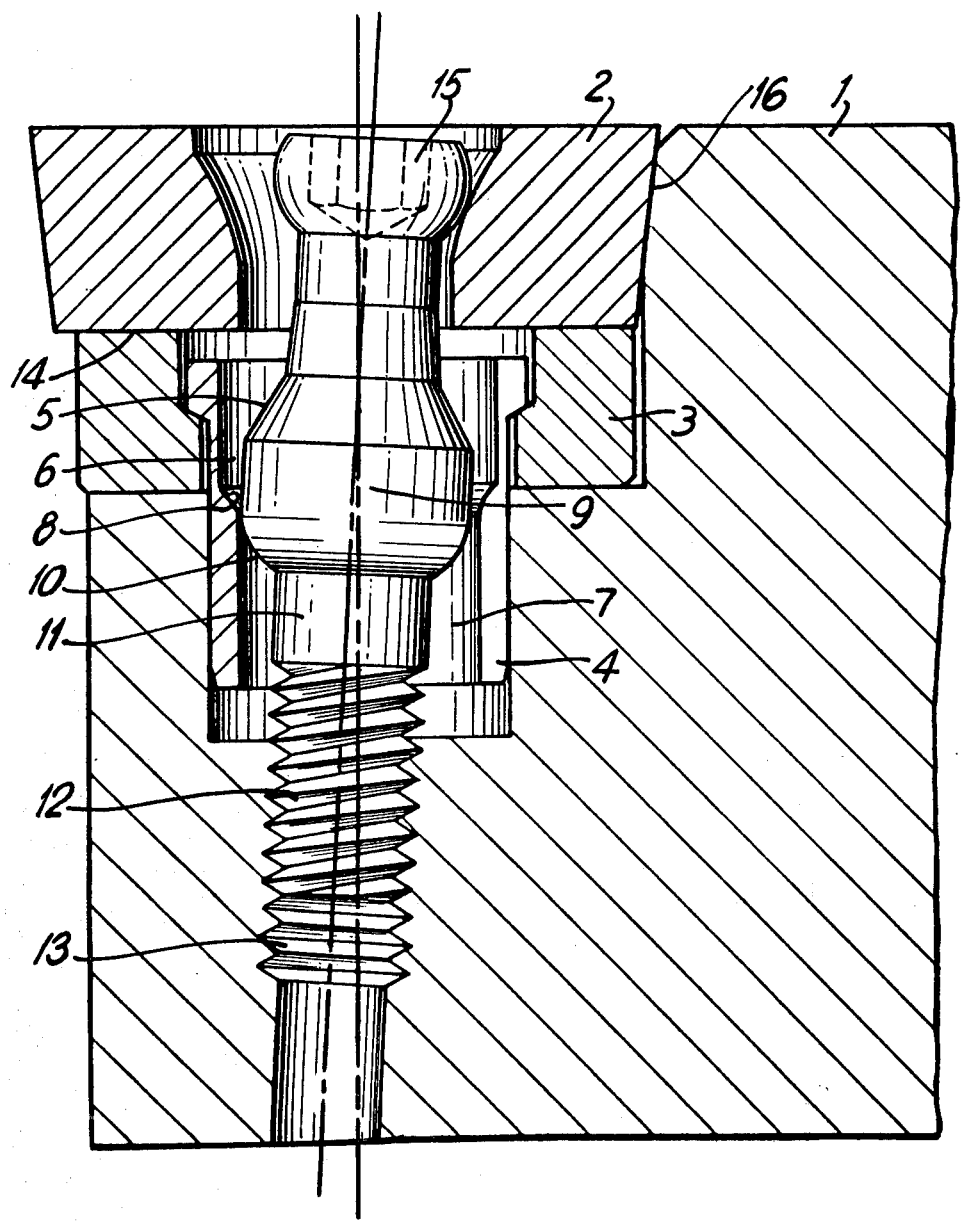
FIG. 2 illustrates in a sectional view a cutting tool in which the two cylindrical sections connected by way of a shoulder are formed by a bushing inserted in the borehole of the body of the tool.

FIG. 2 shows another embodiment of a cutting tool in accordance with the invention, in which the indexable cutting insert 2 is arranged on a base plate 3 in a recess of tool body 1. Base plate 3 is provided with an annular recess disposed concentrically with respect to its center hole, with the collar of a bushing 4 resting in the recess. The bushing 4 is resilient by being provided with a longitudinal slotting and arranged in a cylindrical borehole of tool body 1. The boring of the bushing has an upper cylindrical section 6, having a larger diameter, and with a lower cylindrical section having the smaller diameter. The sections are connected to each other by way of a shoulder 8, having a circular curvature in the longitudinal section. The curved area of shoulder 8 extends without break in curvature into the area of the lower cylindrical section 7. Abutting the cylindrical borehole of tool body 1 there follows a threaded borehole 13 having its longitudinal axis inclined by 3 degrees as compared to the longitudinal axis of bushing 4, and more specifically, towards the lateral supporting surface 16 of indexable cutting insert 2. The clamping bolt 5 has a head section 15, approximately having the shape of a clipped ball, a cylindrical section 9 and a foot section 11 provided with a threaded portion 12. The foot section 11 has a smaller diameter as compared to cylindrical section 9, and is connected with cylindrical section 9 by way of a shoulder 10, provided with a circular curvature in the longitudinal section, with the curved area extending into cylindrical section 9 without break in curvature. The radius of shoulder 8 has a ratio of 1:2.2 to the diameter of cylindrical section 9. The radius of shoulder 10 has a ratio of 1:1.5 to the diameter of cylindrical section 9.

One significant advantage of the cutting tool of the invention lies in the degressive increase of the pressure forces transmitted by a constant angle from the clamping bolt onto the walls of the center hole, the decisive cause being the shoulder with its approximately circular shape in the longitudinal section disposed between the two cylindrical sections for the borehole in the body of the tool, as well as the continuous transition (without break in curvature) from the area of the shoulder into the area of the cylinder having the smaller diameter.

The axis of the threaded borehole with its inclination against the vertical line assures a stabilization of the aforedescribed effect in a case in which the contact point of the shoulder of the center portion of the clamping bolt falls above the shoulder beyond the two cylindrical sections within the zone of the area of the lower cylindrical section.

The ratios between the radii of the two shoulders and the center portion of the bolt assure a practical design range based on the total dimensions presently deemed acceptable for tool bodies, permitting in particular the useful exploitation of the described advantages with respect to the degressive increase of forces.

The inclination of the axis of the threaded boring against the vertical line, moreover, offers the decisive advantage that when clamping starts when the bolt is screwed into place, the bolt is not significantly tilted immediately and jamming of the threaded bolt in the threaded hole as encountered in the known systems is avoided.

With the cutting tool of the present invention, a clamping pressure acting both in the direction of the lateral supporting surface and in the direction of the base plate is built up gradually and with a degressive increase of pressure forces when the bolt is screwed into place.

Thus, the cutting tool according to the invention will find use as a turning, drilling or cutting tool for applications where the cutting work to be carried out demands that the fit of the plate satisfies high requirements.

I claim:

1. In a cutting tool comprising a body which is provided with a threaded borehole, a clamping bolt and a recess and is provided with a supporting surface and at least one lateral supporting surface for supporting an indexable cutting insert which is provided with a center hole for receiving said clamping bolt, said clamping bolt having a rotationally symmetrically shaped portion for engaging said center hole, an upper end having the form approximately of a clipped ball, a lower end screwable into said threaded borehole of the tool body and having the center portion thereof supported on said tool body, the improvement comprising providing said threaded borehole in said tool body in the zone adjacent to said recess with two coaxial, upper and lower cylindrical sections having different diameters and an axial direction extending perpendicular to the surface supporting the cutting insert, said upper cylindrical section tapered towards said lower cylindrical section by way of a tool body shoulder circularly curved in longitudinal section, said tool body shoulder extending without curved projection from said upper cylindrical section to the cylindrical surface of said lower cylindrical section; said clamping bolt having a bolt cylindrical section, a circularly curved bolt foot section and a bolt shoulder section and having a tapered circular curvature in longitudinal section between said bolt cylindrical section and said bolt foot section; said circularly curved bolt shoulder being adapted to contact said circularly curved tool body shoulder as said clamping bolt is tightened, the circular radii of said tool body shoulder and said bolt shoulder section each being in ratio of from 1:1 to 1:2.3 with respect to the radius of said bolt cylindrical section; and said lower cylindrical section of said borehole in said tool body having a lower zone provided with threading which is tilted from 2 to 7 degrees with respect to said axial direction away from the direction of said lateral supporting surface of said cutting insert.

2. The article of claim 1, including a base plate having a center hole supporting the indexable cutting insert and in which the two cylindrical sections connected by way of a shoulder are formed by a bushing inserted in a section of the borehole of the body of the tool which has a constant diameter.

3. The article of claim 2, in which the bushing is slotted in the longitudinal direction and provided with a collar engaging a recess in the base plate.

* * * * *